Dec. 24, 1940.    C. J. BROWN ET AL    2,225,973
ROTARY MUD TREATMENT PROCESS
Filed Aug. 24, 1938
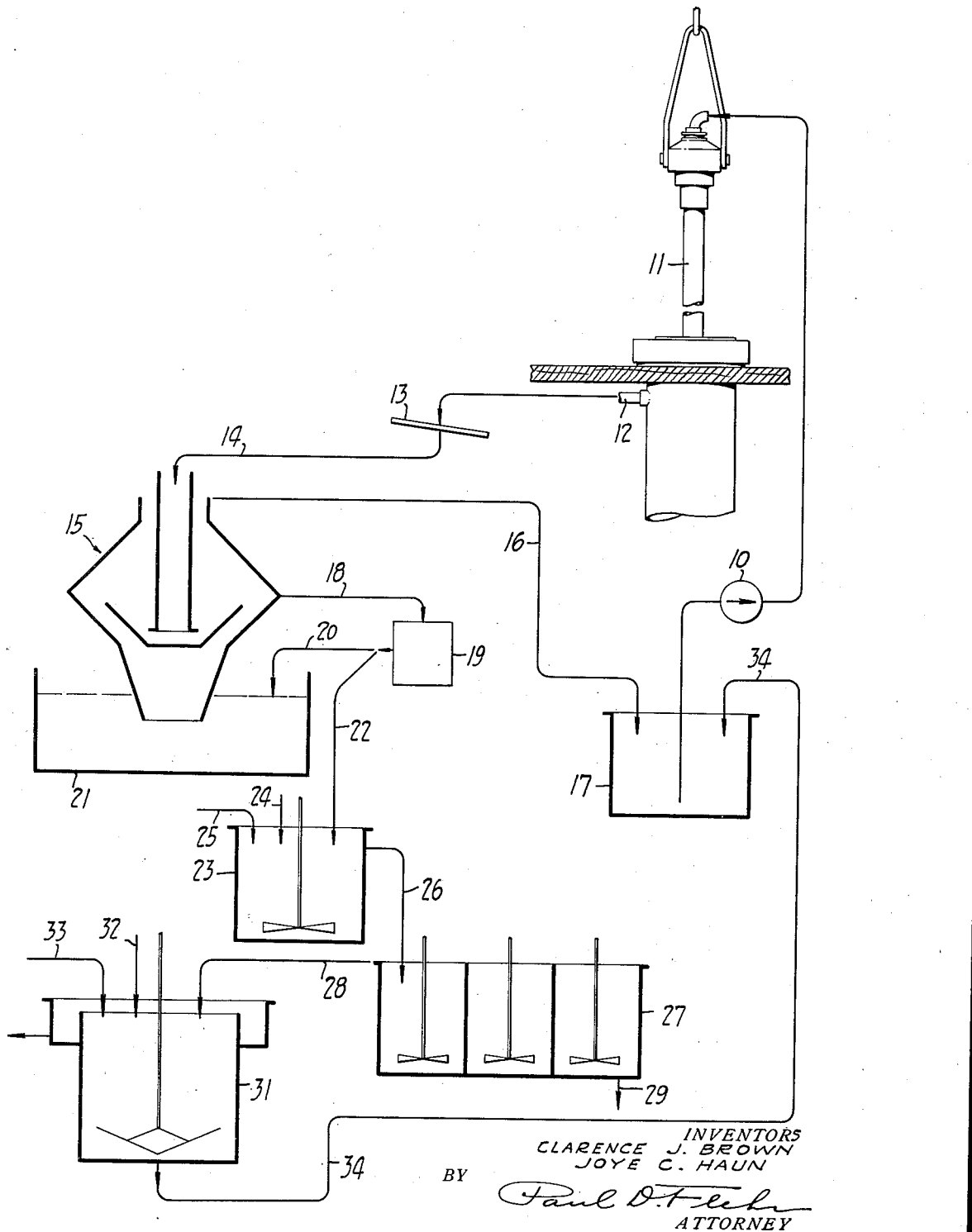
INVENTORS
CLARENCE J. BROWN
JOYE C. HAUN
BY
ATTORNEY Patented Dec. 24, 1940

2,225,973

UNITED STATES PATENT OFFICE 2,225,973

ROTARY MUD TREATMENT PROCESS

Clarence J. Brown, Burlingame, and Joye C. Haun, San Francisco, Calif.

Application August 24, 1938, Serial No. 226,494

8 Claims. (Cl. 209—12)

This invention relates generally to methods for the treatment of "rotary mud" such as is employed in the drilling of oil or gas wells. More particularly it relates to methods whereby a weighting material such as hematite or barite can be recovered from the rotary mud, or whereby the mud can be reconditioned for re-use without loss of weighting material.

It is common practice in the drilling of oil or gas wells to make use of various types of rotary muds which are pumped down through the drill stem of the rotary rig, and then permitted to return to the top of the well through the space between the drill stem and the adjacent wall of the well. Rotary mud circulated in this manner during drilling operations serves to carry cuttings to the surface of the well, to hold back water and gas pressure in the formation, to lubricate the bit, and to plaster the walls of the well to form a seal. In many present day drilling operations, particularly where the operations are extended to great depths, the specific gravity of the mud is increased by the use of various weighting materials like barite and hematite.

As the mud is used it accumulates various detrimental materials including finely divided sand. Sand is undesirable in that it has an abrasive action upon the drilling equipment. It is possible to remove sand by various treatments, such as by the use of centrifuging apparatus of the type disclosed and claimed in Patent No. 1,847,751.

Thus if desired all or a part of the rotary mud as discharged from the well can be delivered to such a centrifuge, whereby the sand is discharged in an underflow, and the clay or other suspending medium discharged in an overflow for return to the circulating pump. It may not be economical to apply such treatment to rotary mud containing relatively large amounts of weighting material, because the weighting material may have settling characteristics comparable to sand. Thus it is not uncommon to discard rotary mud containing relatively expensive weighting material, after it has accumulated considerable amounts of finely divided silica or sand, thus entailing an economic loss because of the cost of weighting material.

It is an object of the present invention to afford a process making possible the economical recovery of weighting material like barite, from rotary mud. It is a further object of the invention to afford a practical process for the continuous reconditioning of rotary mud, and which will make possible the removal of sand from the mud, without appreciable loss of weighting material like barite.

Additional objects of the invention will appear from the following description in which the preferred embodiments of the invention have been set forth in detail, in conjunction with the accompanying drawing.

The present invention makes use of a centrifugal treatment of the rotary mud, whereby substantially all of the sand and a part of the weighting material are discharged in an underflow. This underflow is subjected to froth flotation for separating the weighting material from the sand. If desired the method can be directly associated with the mud circulating circuit of a drilling rig, in which event the recovered weighting material can be returned to the circuit together with the clay or slime containing overflow from the centrifugal separation operation.

Where the method is being used primarily for the purpose of recovering barite or like weighting material from discarded mud, the centrifugal separating operation is adjusted whereby the major part of the weighted material together with sand is discharged in the underflow, which is then subjected to froth flotation, for the separation of the barite from the sand.

The diagrammatic view illustrated in the drawing shows one manner of carrying out the method where the centrifuge operation is closely associated with a drilling circuit. Thus in this instance the mud circuit of the drilling equipment includes the slush pump 10, which delivers rotary mud under pressure of the drill stem 11. After passing down to the bottom of the well the mud flows upwardly about the stem to be finally delivered from the well casing as indicated by line 12, after which it is subjected to a screening operation 13 for the removal of oversize material. Line 14 represents delivery of the screened mud to a centrifuge 15. This centrifuge can be of the type disclosed and claimed in Patent No. 1,847,751, in which a large quantity of the underflow is continuously returned back to the centrifuge chamber, thus avoiding clogging of the discharge nozzle. Line 16 represents the discharge of an overflow from the centrifuge bowl, and this overflow consists mainly of the clay or like suspender together with a large percentage of the weighting material present in the mud, such as barite. As illustrated, this overflow can be delivered back to the inlet pump 17 of the pump 10 and thus returned to the well.

The underflow 18 from the centrifuge consists of sand and cuttings, together with the remainder of the weighting material. It may be explained that the weighing material generally varies considerably as to particle size, and that in the centrifuge chamber it is subjected to classification, with coarser particles passing out with the underflow, and the finer particles passing out of in the overflow. The underflow discharge from the nozzle of the centrifuge is shown being delivered to the specific gravity apparatus 19, which automatically controls the flow whereby one part 20 is returned to tank 21 for re-introduction into the centrifuge chamber, while another part 22 is diverted for final delivery. Such an arrangement is disclosed in said Patent No. 1,847,751 and it is to be understood that the average rate of return of the underflow passing to the centrifuge chamber, may be many times the average rate of withdrawal by way of line 22. The function of specific gravity control device 19, as pointed out in said Patent No. 1,847,751, is to maintain the underflow between predetermined gravity limits.

The underflow draw-off 22 is shown being delivered to the mixing tank 23, where it is desirable to dilute the material and to introduce a froth flotation agent. Line 24 represents introduction of water for dilution, while line 25 represents introduction of the froth flotation reagent. The extent of dilution may vary, although in a typical instance an underflow containing one part water to one part solids can be diluted to one part solids to three or four parts of water.

A variety of flotation reagents can be used, although the reagent employed should be selected with due regard to the particular type of weighting material being removed. Both hematite and barite can be removed from the sand by the use of soluble soaps such as sodium stearate and sodium resinate, and the like. For the separation of barite we have secured satisfactory results by employing sodium oleate together wtih oleic acid, in proportions of the order of 0.33 pound of sodium oleate and 0.05 pound of oleic acid per dry ton of material treated. Should the water in the rotary mud be hard, suitable water softening reagent can be utilized in order to economize in the use of flotation agents. Thus in the diluting operation in tank 23 water softening reagents like sodium silicate can be introduced, in addition to the flotation reagents, and care can be taken to use soft water for dilution purposes.

From the mixing tank 23 the dilute material containing the reagent is shown being delivered (line 26) to a flotation apparatus 27, which may consist of one or more conventional flotation cells. As is well known by those skilled in the art of flotation, agitation and aeration of the material in the flotation cells causes the material being separated, in this instance the weighting material, to be removed in a froth. The froth is shown being removed by line 28, while line 29 represents removal of the sand to waste. The flotation can be carried out efficiently with a minimum amount of flotation chemical. This is attributed in part to the classification of weighting material in the centrifuge, and to the fact that the classified fraction of the weighing material being floated is relatively uniform as to particle size.

Where it is desired to re-use the recovered barite or other weighting material in the mud circuit, residual soapy material which it carried may cause some undesirable frothing of the mud. In order to avoid this possibilty the froth is shown being delivered to a thickener 31, where it is diluted by introduction of water, and where the foam may be quickly broken down by use of suitable chemical such as an acid like sulphuric or hydrochloric, or an alkali like lime. Thus line 32 represents introduction of a diluting water into the thickener, while line 33 represents introduction of a chemical like hydrochloric or sulphuric acid. Thus soaps are definitely neutralized or broken down, and the barites settle to the bottom of the thickener for removal by line 34. If desired the removed barites can be directly returned to the mud circuit, as for example to the sump 17, for remixing with the remainder of the circulated mud.

Where one makes use of the present method for recovering barite from discarded rotary mud, the centrifuge 15 can be operated in such a manner that the major part of the barite or other weighting material passes out with the sand in the underflow. Thus assuming that one has a quantity of discarded rotary mud from which it is desired to recover the weighting material, such as barite, this mud is first diluted to proper consistency, as for example two parts water to one part solids, and it is then fed to the centrifuge 15. Colloids in the mud may be deflocculated by the use of suitable chemical such as sodium silicate or an acid like sulphurous acid, in order to facilitate separation of the barite from the clay. Also it is helpful to introduce a wash water into the return circuit of the centrifuge, as for example by introducing fresh water directly into the tank 21, with the rate of introduction of this wash water such that a part of this water flows countercurrently through the centrifuge chamber, to be delivered with the overflow. Such operation has the effect of not only diluting the overflow, but of assisting separating with discharge of the major part of the barite or like weighting material in the underflow with the sand. The underflow is then subjected to a flotation operation whereby the barite is separated in a froth. By the procedure described it is possible to strip substantially all of the barite content from a quantity of discarded rotary mud.

Instead of simply stripping barite from discarded rotary mud, such mud may be reconditioned for re-use by removing sand from the mud without loss of barite content. In this instance the procedure is substantially as first described, except that the method is not closely associated with the drilling circuit. Thus the mud is supplied to the centrifuge 15, substantially as illustrated in the flow sheet of the drawing, and the centrifuge 15 operated as first described whereby the major part of the barite passes out with the clay in the overflow 16, and the remainder of the barite discharged in the underflow with the sand. The underflow is then subjected to flotation as first described, for the separation of the barite. This recovered barite can then be treated for definitely breaking down or neutralizing the flotation reagent, after which it may be re-mixed with the overflow to form a reconditioning mud.

Our invention affords a practical solution to the problem of reconditioning rotary mud without loss of weighting material, or for the recovery of weighting material from rotary mud. Irrespective of the precise form in which the invention is practiced, the method is characterized by carrying out the flotation operation upon the underflow of the centrifuge, and this underflow is necessarily a relatively small portion of the entire mass of rotary mud. Thus our method is economical in its use of flotation reagents, and in addition the flotation equipment required need not be of excessive uneconomical size. The flotation operation is carried out upon a centrifuged portion of the rotary mud, and there is an absence of colloids or particles of extreme fineness such as are known to reduce the efficiency of a flotation operation. Efficient flotation upon the underflow is also attributed in part to the intense scrubbing action to which the particles are subjected within the centrifuge equipment. As previously pointed out the centrifuge equipment is characterized by use of a return circuit in which the underflow material is continuously returned for retreatment within the centrifuge chamber. In discharging from the underflow nozzles, the material is subjected to severe attrition and scrubbing, whereby the surfaces of the weighting material are scoured and placed in ideal form for flotation.

It is to be understood that certain features of the present invention may be applicable to materials other than rotary mud, as for example materials containing components capable of comparable treatment.

We claim:

1. In a method for the recovery of weighting materials like barite or hematite from rotary mud, subjecting the mud to centrifugal separation whereby at least a part of the weighting material of the mud appears in the underflow, and subjecting the underflow to froth flotation for removal of the weighting material.

2. In a method for recovering weighting material like barite or hematite from rotary mud, where the mud consists of a suspending medium like clay together with sand, subjecting the mud to centrifugal separation whereby sand and at least a part of the weighting material is discharged in an underflow, and subjecting the underflow to froth flotation whereby the weighting material is separated from the sand.

3. In a method for the recovery of weighting material like barite from rotary mud, where the mud consists of sand together with a suspending medium like clay, subjecting the mud to centrifugal separation whereby sand and a part of the barite are discharged in an underflow, and adding a froth flotation agent to the underflow and subjecting it to agitation for separating the barite in a froth.

4. In a method for the reconditioning of rotary mud, where the mud consists of a weighting material like barite, sand and a suspending medium like clay, subjecting the mud to centrifugal separation whereby clay and a part of the barite are discharged in an overflow and whereby sand and another part of the barite are discharged in an underflow, and subjecting the underflow to froth flotation whereby barite contained in the same is separated from the sand.

5. In a method for the reconditioning of rotary mud where the mud is being pumped into a well and is being continuously re-used as discharged from the well, the mud being weighted with materials like barite or hematite, subjecting at least a part of the mud as discharged from the well to centrifugal separation, whereby clay and a substantial percentage of the weighting material is discharged in an overflow for re-use, and whereby sand and a substantial part of the weighting material is discharged in an underflow, and subjecting the underflow to froth flotation for separation of the weighting material from the sand, whereby the weighting material is made available for re-use.

6. In a method for the treatment of rotary drilling mud, where the mud contains sand, a suspending medium like clay, and a weighting medium like barite or hematite, and where the mud is being continuously circulated through a well, the steps of causing at least a part of the mud as it is discharged from the well to be subjected to centrifugal separation, whereby clay and a part of the weighting material is discharged in an overflow and sand and another part of the weighting material discharged in an underflow, subjecting the underflow to froth flotation whereby the weighting material is separated from the sand and removed in a froth, and causing the froth to be broken down and any frothing agent carried by the same to be substantially removed from the weighting material, whereby the weighting material is made available for re-use in rotary mud.

7. In a method for the treatment of rotary mud, where the mud contains a weighting material like barite or hematite, sand and a suspending medium like clay, and where the mud is being continuously circulated through a well, the steps of subjecting at least a part of the rotary mud to centrifugal separation whereby clay and a part of the weighting material are discharged in an overflow and sand and another part of the weighting material discharged in an underflow, introducing a flotation agent into the underflow, subjecting the underflow to agitation whereby the weighting material is separated and removed in a froth, and then breaking down the froth and substantially freeing the recovered weighting material of flotation reagent carried by the froth.

8. In a method for the treatment of rotary mud, of the type containing barite, a suspender like clay, and sand, where the mud is being continuously pumped down into a well under pressure and continuously returned to the inlet side of the pump as it is discharged from the well, the method comprising causing at least a part of the mud as discharged from the well to be subjected to centrifugal separation whereby clay and a substantial part of the barite is discharged in an overflow and sand and the remainder of the barite discharged in an underflow, causing the overflow to be delivered directly to the inlet of said pump, adding a soluble soap type of froth flotation agent to the underflow, subjecting the underflow to agitation whereby barite is separated from the sand and removed in a froth, diluting and breaking down the froth, and removing the recovered barite from the dilution for re-use.

CLARENCE J. BROWN.
JOYE C. HAUN.